United States Patent
Meulendijks et al.

(10) Patent No.: US 11,076,627 B2
(45) Date of Patent: Aug. 3, 2021

(54) COATING OF FOOD PRODUCTS WITH A PARTICULATE COATING MATERIAL

(71) Applicant: MAREL FURTHER PROCESSING B.V., Boxmeer (NL)

(72) Inventors: Johannes Martinus Meulendijks, Deurne (NL); Wilhelmus Johannes Jacobus Maria Van Der Straaten, Sambeek (NL); Martinus Johannes Willebrordus Van Zoelen, 's-Hertogenbosh (NL); Mathias Marcellus Kuijpers, Wijchen (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 0 days.

(21) Appl. No.: 16/772,624

(22) PCT Filed: Dec. 21, 2018

(86) PCT No.: PCT/NL2018/050874
§ 371 (c)(1),
(2) Date: Jun. 12, 2020

(87) PCT Pub. No.: WO2019/125168
PCT Pub. Date: Jun. 27, 2019

(65) Prior Publication Data
US 2020/0375240 A1    Dec. 3, 2020

(30) Foreign Application Priority Data
Dec. 22, 2017  (NL) .................................... 2020168

(51) Int. Cl.
*B05C 5/00* (2006.01)
*B05D 1/30* (2006.01)
(Continued)

(52) U.S. Cl.
CPC .............. *A23P 20/12* (2016.08); *B05C 5/007* (2013.01); *B05C 19/04* (2013.01); *B05C 19/06* (2013.01); *B05D 1/30* (2013.01)

(58) Field of Classification Search
CPC .......... A23P 20/12; A23P 20/13; B05C 5/007; B05C 19/04; B05C 19/06; A23G 3/2076; A23G 3/26; B05D 1/30
(Continued)

(56) References Cited

U.S. PATENT DOCUMENTS 4,936,248 A * 6/1990 Miller ..................... A23P 20/12
                                                             118/24
5,056,455 A * 10/1991 Ritz ........................ A23P 20/12
                                                             118/17
(Continued)

FOREIGN PATENT DOCUMENTS

CA       2486018 A1     4/2006
CN      101160180 A     4/2008
(Continued)

OTHER PUBLICATIONS

Search Report from corresponding Dutch Application No. NL2020168, dated Aug. 31, 2018.
(Continued)

*Primary Examiner* — Laura Edwards
(74) *Attorney, Agent, or Firm* — Workman Nydegger

(57) ABSTRACT

An in-line coating machine adapted to coat food products with a particulate coating material has a food products conveyor; a coating device; an excess coating material separation station; an excess coating material recovery conveyor; and a particulate coating material elevator device. An elevator device fill assembly along the recovery conveyor is configured to fill the elevator device with recovered excess coating material. An adjustable discharge opening device
(Continued)

controls a discharge opening in the recovered excess coating material bed support. An adjustable upper layer diverter device engages an upper layer of the recovered excess coating material bed passing over the recovered excess coating material bed support and diverts at least a portion of the upper layer at an adjustable rate into the particulate coating material elevator device.

19 Claims, 6 Drawing Sheets

(51) Int. Cl.
*B05C 19/04* (2006.01)
*B05C 19/06* (2006.01)
*A23P 20/12* (2016.01)

(58) Field of Classification Search
USPC ...... 118/13, 16, 19, 22, 24, 30, 418; 99/494; 426/96
See application file for complete search history.

(56) References Cited

U.S. PATENT DOCUMENTS

| | | |
|---|---|---|
| 5,951,760 A | 9/1999 | Kuenen |
| 6,510,809 B2 * | 1/2003 | Kuenen .................. A23P 20/12 118/13 |
| 7,231,885 B1 * | 6/2007 | Nothum, Jr. ............ A23P 20/13 118/13 |
| 7,757,629 B2 | 7/2010 | Lydon et al. |
| 9,635,873 B2 | 5/2017 | Heinzen |
| 2003/0079678 A1 | 5/2003 | Zeegers et al. |
| 2006/0231022 A1 | 10/2006 | Lydon et al. |
| 2010/0002597 A1 | 1/2010 | Sampath et al. |
| 2012/0121774 A1 | 5/2012 | Marjeram et al. |
| 2015/0044339 A1 | 2/2015 | Heinzen |
| 2017/0099854 A1 | 4/2017 | Mecrin et al. |

FOREIGN PATENT DOCUMENTS

| | | |
|---|---|---|
| CN | 102574150 A | 7/2012 |
| CN | 101160180 B | 11/2012 |
| CN | 105555144 A | 5/2016 |
| CN | 106455672 A | 2/2017 |
| EP | 1591023 A1 | 11/2005 |
| GB | 2099276 A | 12/1982 |
| GB | 2269083 A | 2/1994 |
| JP | 2001103948 A | 4/2001 |

OTHER PUBLICATIONS

International Search Report and Written Opinion from PCT Application No. PCT/NL2018/050874, dated Mar. 18, 2019.
Chinese Search Report from CN Application No. 201880081065.X, dated Apr. 13, 2021.
Chinese Office Action from CN Application No. 201880081065.X, dated Apr. 19, 2021.

* cited by examiner

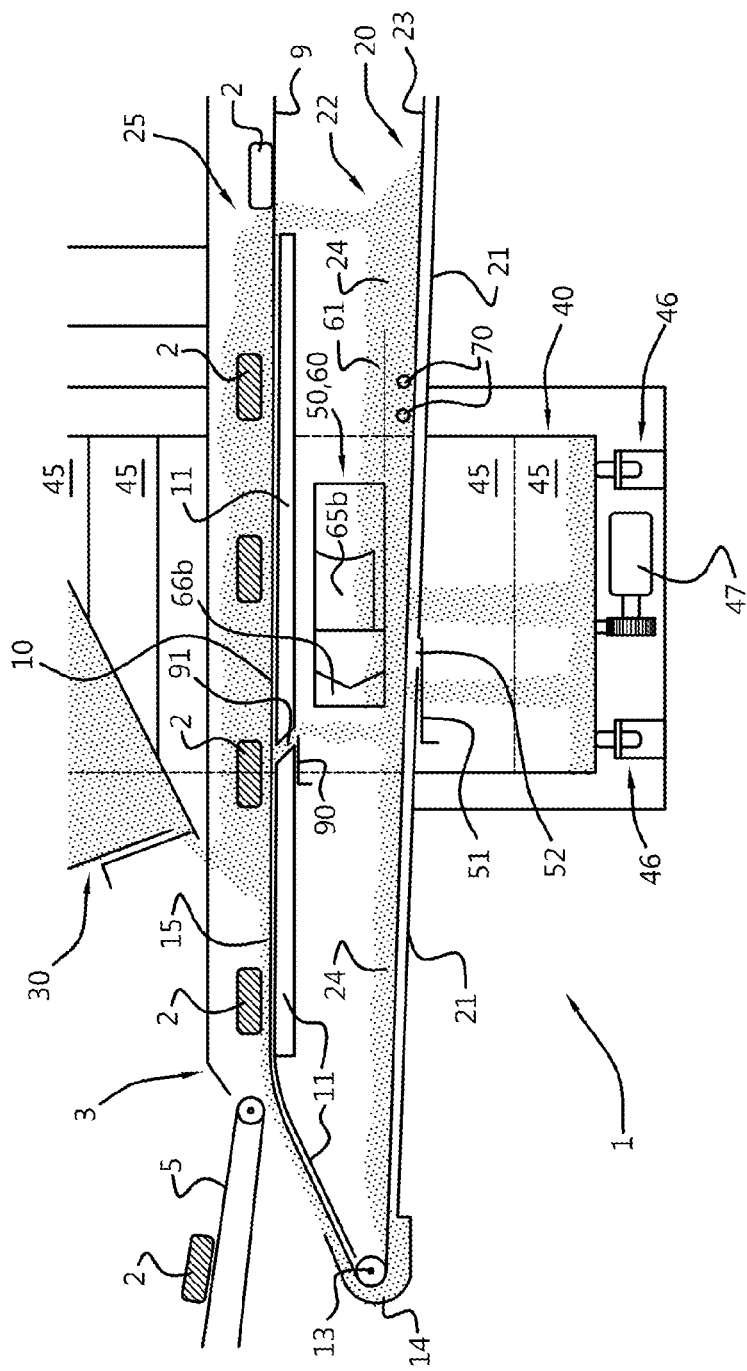

COATING OF FOOD PRODUCTS WITH A PARTICULATE COATING MATERIAL

BACKGROUND

The invention relates to a machine and method for coating food products with a particulate coating material, for example in an embodiment allowing for use in large scale food preparation wherein large volumes of food pieces are to be coated, e.g. allowing subsequent in-line cooking, e.g. by frying.

Food product coating machines for coating with a particulate coating material are well-known from the prior art and widely available in the field. When handling particulate coating material, inevitably a particle size distribution will be present in the coating material, comprising relatively coarse and relatively fine particles.

For example in the currently marketed version of the RotoCrumb coating machine a bottom coating device is present which comprises a bottom coating material bed support which is adapted to support thereon a bottom coating material bed of particulate coating material, e.g. of dry particulate coating matter. The food products to be coated are received on this bottom coating material bed. A bottom coating material bed advancing conveyor run is present above this bed support and is configured to convey the bottom coating material bed and the food products received thereon over the bottom coating material bed support. The machine also has a top coating device adapted to be supplied with particulate coating material and to discharge the particulate coating material from above onto the food products received by the bottom coating material bed. In this version of the RotoCrumb machine excess coating material is recovered for re-use and transferred to the top coating device by means of a revolving elevator wheel. Herein both the bottom coating material bed advancing conveyor run and the lower recovery conveyor run each extend through the central opening of the annular wheel body, the lower recovery conveyor run below the bottom coating material bed advancing conveyor run. The particulate coating material elevator wheel passes over the top coating device such that particulate coating material is gravity fed from pockets thereof into the top coating device.

As explained in EP1591023, a known in-line coating machine comprises an elevator wheel fill assembly arranged along the lower recovery conveyor run downstream of the reception location and configured to fill pockets of the revolving particulate coating material elevator wheel with recovered excess coating material. This document discloses, as is present in currently marketed version of the RotoCrumb coating machine, that this elevator wheel fill assembly comprises one or more adjustable discharge opening devices adapted to control one or more discharge openings in the recovered excess coating material bed support allowing to discharge at an adjustable rate a portion of the recovered excess coating material bed passing over said one or more discharge openings into pockets of the particulate coating material elevator wheel. This in-line coating machine is also embodied to transfer recovered excess coating material remaining in the excess coating material bed downstream of this elevator wheel fill assembly to the bottom coating material bed advancing conveyor run.

SUMMARY

The aim of the present invention is to provide one or more improvements, e.g. in view of a more versatile in-line coating machine, more particularly in view of providing the operator of the in-line coating machine with enhanced control over the coating process and thus over the end result achieved by the coating machine.

For example consumer demand requires operators sometimes to perform the coating such that the food products are coated uniformly on the top and bottom, so that a uniform appearance is created. The same operators may sometimes desire the top and bottom coating to differ, e.g. with more coarse particles on top than on the bottom. So, in general, it is desirable to have enhanced control of the coating process and management of coarse and fine particulates in the system.

The present invention achieves one or more of the above objectives by providing an in-line coating machine, which is characterized in that the elevator device fill assembly further comprises:

an adjustable upper layer diverter device that is configured to engage an upper layer of the recovered excess coating material bed passing over the recovered excess coating material bed support, with a lower layer passing underneath the diverter device, and to divert at an adjustable rate at least a portion of said upper layer into the particulate coating material elevator device.

By providing both the one or more adjustable discharge opening devices adapted to control one or more discharge openings in the recovered excess coating material bed support and the adjustable upper layer diverter device, the operator is able to control, or at least has enhanced control of, the particle size distribution of the excess coating material that is transferred by means of the elevator device to a coating device, e.g. a top coating device, of the machine.

Most practically used particulate coating materials, a breading crumb material, comprises a relative fine fraction and a relative coarse fraction of particulate coating material. In the excess coating material bed some segregation into an upper layer composed of a relative coarse fraction of the particulate coating material and a lower layer of a relative fine fraction of the particulate coating material will in practice occur, e.g. due to interaction of the bed with the recovery conveyor run. The elevator device fill assembly can now be operated to cause a desired rate of relative fine fraction excess coating material to be discharged from the lower layer by control of the one or more adjustable discharge opening devices and associated one or more discharge openings in the recovered excess coating material bed support and to be received by the elevator device, for example in pockets of a revolving coating material elevator wheel. And the elevator device fill assembly can be operated to cause a desired rate of relative coarse fraction excess coating material in the upper layer to be diverted by the adjustable upper layer diverter device engaging the upper layer into the elevator device, for example in pockets of a particulate coating material elevator wheel.

It will be appreciated that operating the elevator device fill assembly may include one of said discharge rate being nil so that only the relatively coarse or the relative fine fraction passes into the elevator device.

It will be appreciated that operating the elevator device fill assembly also impacts the composition of what remains of the excess coating material bed downstream of the elevator device fill assembly. In embodiments of the machine, this remainder is re-used for a bottom bed of coating material whereas the elevator device is applied to transfer excess material to a top coating device. Operation of the elevator fill assembly then also impacts the composition of the re-use material for the bottom bed.

In an embodiment the in-line coating machine is further provided with a particles segregation enhancing assembly adapted to subject the recovered excess coating material bed passing over the recovered excess coating material bed support, upstream of the elevator device fill assembly, to a segregation enhancing action in order to cause the upper layer engaged by the upper layer diverter device to be composed of a relative coarse fraction of the particulate coating material and to cause a lower layer of the excess coating material bed to be composed of a relative fine fraction of the particulate coating material.

For example the particles segregation enhancing assembly comprises one or more passive, so-non driven, particles segregation enhancing members arranged in the path of the recovered excess coating material bed upstream of the elevator device fill assembly. For example one or more passive members, e.g. one or more rods, extend above the recovery conveyor run, e.g. extend across, at least a part of, the width of the excess material bed, so that said excess material is agitated by the passive members enhancing said segregation. For example one or more rods, possibly rectilinear rods, extends horizontally parallel to the conveyor run across the width of the excess material coating bed.

In another embodiment one or more driven, e.g. vibratory driven, particles segregation enhancing members are arranged in the path of the recovered excess coating material bed upstream of the elevator device fill assembly. For example one or more rods extending across the bed are driven by a vibratory device.

For example the particles segregation enhancing assembly comprises one or more conveyor run agitator members engaging the conveyor run and configured to agitate said conveyor run, e.g. cause vibration or enhanced vibration of the conveyor run, thereby inducing or enhancing particle segregation.

For example the particles segregation enhancing assembly comprises a vibratory device acting on the recovered excess coating material bed support, e.g. on a portion thereof, thereby inducing or enhancing particle segregation.

In embodiments the particles segregation enhancing assembly comprises a variety of different functionality members or devices to thereby inducing or enhancing particle segregation upstream of the elevator wheel fill assembly.

In embodiments the particles segregation enhancing assembly is configured to allow an operator and/or control system, e.g. a programmed electronic control system, to vary the intensity of the particles segregation caused by the assembly upstream of the elevator wheel fill assembly.

It will be appreciated that in embodiments said particles segregation enhancing assembly could be switched off or even removed, so that said action is nil.

In embodiments the recovery conveyor run is closely above the recovered excess coating material bed support or, as is preferred, said recovery conveyor run rests on and slides over the support. It has been observed that for many practical particulate coating materials this arrangement causes the most uniform advancement of the bed over the support.

In embodiments the recovery conveyor run is a mesh belt conveyor, e.g. a wire mesh belt conveyor.

In embodiments the bottom coating material bed advancing conveyor run is a mesh belt conveyor, e.g. a wire mesh belt conveyor.

In embodiment the recovery conveyor run and the bottom coating material bed advancing conveyor run are formed by one and the same belt conveyor, e.g. a mesh belt conveyor, e.g. a wire mesh belt conveyor.

In embodiments, the in-line coating machine comprises an elongated continuous conveyor comprising both an advancing run for a bottom coating bed and the recovery run which runs in the opposite direction. It is also conceivable, but less preferred, that separate conveyors are provided for the bottom coating bed advancing run and the recovery run.

In embodiments, the upper layer diverter device, or at least a part thereof engaging the upper layer, is arranged in proximity and/or upstream of the one or more discharge openings in the recovered excess coating material bed support. An upstream arrangement will allow for the diverting action to be caused, at least in part, ahead of the discharge of (a portion of) the lower layer of the excess coating material bed, e.g. thereby avoiding undue interference with the desired diversion of the coarse fraction to the elevator device. Having these functionality in proximity of one another allows for a compact design, e.g. in view of an embodiment wherein pockets of an elevator device pass underneath the recovered excess coating material bed support and vertically under both the one or more discharge openings in the bed support and the point or points of discharge by the diverter device so that the coating material drops directly into the pockets.

In embodiments, in view of adjusting the action and thus the rate and/or composition of the coating particles stream into the elevator device, e.g. into the pockets of an elevator wheel, the upper layer diverter device is adjustable with respect to at least one of:
  height relative to the recovered excess coating material bed support allowing to control the thickness of the upper layer engaged by the upper layer diverter device;
  width relative to the recovered excess coating material bed support allowing to control the width of the portion of the upper layer engaged by the upper layer diverter device, angular orientation of the upper layer diverter device relative to a direction of conveyance of the recovered excess coating material bed when seen in top view.

In embodiments the in-line coating machine further comprises a height adjustment mechanism adapted to adjust the distance between the upper layer diverter device and the recovery run. For example the closer the upper layer diverter device is to the recovery run, the more fine particles will be recovered.

In embodiments the in-line coating machine further comprises an angle adjustment mechanism adapted to adjust the angular orientation of the upper layer diverter device relative to the direction of conveyance of the recovered excess coating material bed when seen in top view, e.g. the diverter device having diverter blade pivotable about a vertical rotation axis. For example the mechanism allows to set the angular orientation thereby covering an adjustable width of the recovery run by means of the upper layer diverter device or part thereof.

In embodiments the recovered excess coating material bed support has opposed first and second lateral sides, wherein the upper layer diverter device is adapted to divert a first stream of upper layer excess coating material over the first lateral side and into the elevator device, e.g. into pockets of a particulate coating material elevator wheel, and to divert a second stream of upper layer excess coating material over the second lateral side and into the elevator device, e.g. into pockets of a particulate coating material elevator wheel. This for example allows for enhanced diversion from a relatively wide excess material bed, e.g. as the lower layer will be not or less disturbed compared to a situation wherein just one stream is diverted over just one lateral side.

In practical embodiments the recovered excess coating material bed support has opposed first and second lateral sides, wherein the upper layer diverter device comprises at least one diverter blade engaging the upper layer and diverting at least a portion thereof over one of said lateral sides and into the elevator device, e.g. into pockets of a particulate coating material elevator wheel, for example wherein the upper layer diverter device has two diverter blades, each adapted to divert a respective stream of the upper layer excess coating material over a respective lateral side and into the elevator device, e.g. into pockets of a particulate coating material elevator wheel. For example the in-line coating machine has two blades arranged in a V with point counter to the direction of conveyance of the recovered excess coating material bed when seen in top view. The blades may meet at the point or may have spaced apart ends to leave a gap between the ends. For example each of the blades is attached, e.g. movable in height and/or in angular orientation, to a raised lateral housing wall.

In a practical embodiment the upper layer diverter device has a first set of one or more diverter blades at a first location along the path of the recovery conveyor run and a second set of one or more diverter blades at a second location, downstream of the first location. For example the first set comprises two blades arranged in a V with a point counter to the direction of conveyance of the recovered excess coating material bed when seen in top view, and with spaced apart ends to leave a gap in between said ends, and a second set of two blades arranged in a V with a point counter to the direction of conveyance of the recovered excess coating material bed when seen in top view, and with ends joined at said point.

In a practical embodiment the in-line coating machine has a housing with a pair of lateral housing walls between which the recovery conveyor run travels and raised to extend above said conveyor run and the coating material bed, wherein one or both of said lateral housing walls have an opening therein through which diverted coating material is passed. Preferably said one or more lateral housing wall openings are located vertically above a lower section of the elevator device, e.g. a lower section of an elevator device that comprises a mobile array of pockets adapted to receive therein particulate coating material, said elevator device being adapted to move said mobile array of pockets along an endless path that passes said elevator device fill assembly in order to fill excess particulate coating material into said pockets and that passes said coating device in order to discharge said coating material from said pockets and supply said discharged coating material to said coating device. For example the elevator device has a revolving elevator wheel, such that diverted coating material drops directly into pockets of said wheel.

In embodiments the upper layer diverter device is adapted to divert upper layer excess coating material over one or both lateral sides of the recovery conveyor run at a location located vertically above a lower section of the revolving elevator wheel, such that diverted coating material drops directly into pockets of said wheel.

In embodiments the coating device is a top coating device that is adapted to be supplied with particulate coating material by the elevator device and to discharge the particulate coating material from above onto the food products conveyed by the food products conveyor in a direction of conveyance.

In another embodiment the coating device supplied by the elevator device is a bottom coating device, e.g. embodied to create a bottom bed of coating material on which the products to be coated are received.

In embodiments the coating machine comprises a revolving drum having a drum entrance for food products, possibly products already coated by a top and/or bottom coating device(s) of the same machine, possibly receiving both (already coated) food products and particulate coating material, and having a drum exit. For example the drum is embodied as a tumbling drum adapted to subject the food products, possibly in the presence of particulate coating material, to a tumbling action. This may, for example, cause an enhanced coating of the products, e.g. in view of uniform coverage and/or adhesion strength. For example the drum is mounted in the machine for revolution about a substantially horizontal rotation axis, driven by a corresponding drum drive.

In embodiments the elevator device comprises a mobile array of pockets adapted to receive therein particulate coating material, said elevator device being adapted to move said mobile array of pockets along an endless path that passes said elevator device fill assembly in order to fill excess particulate coating material into said pockets and that passes said coating device in order to discharge said coating material from said pockets and supply said discharged coating material to said coating device. An example hereof is the elevator wheel.

Another example is a bucket conveyor, e.g. as shown in GB2099276. Another example is a drag-chain conveyor, e.g. as in US2010/002597. For example the elevator device has a channel with a lower section, an upper section, an ascending section and a descending section, wherein a looped drag-chain is arranged in the channel and has flights defining pockets. The looped drag-chain is driven to circulate through the channel, wherein the pockets are filled by the fill assembly in the lower section of the channel and the pockets are emptied in the upper section of the channel. The channel can be circular, square (with rounded corners), etc.

In a preferred embodiment the elevator device comprises a particulate coating material elevator wheel, the elevator wheel comprising:
  an annular wheel body adapted to revolve about an axis of rotation and having a central opening;
  a circumferential array of pockets in said annular wheel body, the pockets being open towards the central opening of the elevator wheel.

As explained such an elevator wheel is present in the currently marketed RotoCrumb machine.

Preferably the food products conveyor assembly and the recovery conveyor each extend through the central opening of the annular wheel body of the elevator wheel, the recovery conveyor run below the food products conveyor assembly, wherein the elevator wheel passes below the elevator device fill assembly allowing excess material to be gravity fed into the pockets.

In embodiments the coating device is a top coating device adapted to be supplied with particulate coating material by the elevator device and to discharge the particulate coating material from above onto the food products conveyed by the food products conveyor in a direction of conveyance.

In embodiments the coating device is a top coating device adapted to be supplied with particulate coating material by the elevator device and to discharge the particulate coating material from above onto the food products conveyed by the food products conveyor in a direction of conveyance. Herein the pockets of the particulate coating material elevator device pass over the top coating device such that particulate coating material is gravity fed from a pocket into the top coating device.

In embodiments the machine comprises one or more particle distribution enhancing members that are configured to influence the distribution of particles supplied by the elevator device to the top coating device, e.g. supplied to a hopper of the top coating device. For example the one or more particle distribution enhancing members are configured to provide for, or enhance, a uniform distribution of particle sizes over the width of the top coating device.

For example, in embodiments, the elevator device comprises a particulate coating material elevator wheel having an annular wheel body that is adapted to revolve about an axis of rotation and having a central opening, and further having a circumferential array of pockets in the annular wheel body, the pockets being open towards the central opening of the elevator wheel. In operation, as generally known in the art, particulate coating material received in a pocket is dropped from the pocket when the pocket passes through a top arc segment of the circular path, the dropped coating material being received by the top coating device. In such arrangement said one or more particle distribution enhancing members may be integrated in the machine to influence the distribution of the dropped particle sizes, e.g. over the width of the top coating device.

For example one or more particle distribution enhancing members may be arranged in a path of dropped coating material, e.g. to counteract any particle size segregation due to differently sized particles having different flights paths when dropped from the pocket. Such members can, for example, be mounted on the frame of the machine. For example the one or more particle distribution enhancing members are embodied as posts, bars, plate members, etc. bars in a geometric pattern so as to cause the flow of dropped particulate coating material to evenly spread, in particular over the width of the top coating device, e.g. in view of counteracting undesirable segregation of the material reaching the top coating device. For example a multitude of such members is provided, e.g. in a stationary yet adaptable arrangement. For example at least 10 such members are provided. One could also envisaged one or more pervious screens or one or more pervious belts for the same purpose.

In embodiments, the machine is provided with two particulate coating material elevator wheels mounted side-by-side and having opposed rotation directions, preferably about a common axis, most preferably common horizontal axis. As preferred, herein the food products conveyor assembly and the recovery conveyor each extend through the central openings of the annular wheel bodies of the elevator wheels, the recovery conveyor run below the food products conveyor assembly. Both elevator wheels pass below the elevator device fill assembly allowing excess material to be gravity fed into the pockets. This allows to supply particulate material into the top coating device using both counter-rotating elevator wheels which may allow for an improved particle size distribution in the top coating device.

In embodiments the machine comprises a bottom coating device comprising:
  a bottom coating material bed support, wherein the bottom coating material bed support is adapted to support thereon a bottom coating material bed of particulate coating material, wherein the machine is configured so that products to be coated are received on said bottom coating material bed,
  a bottom coating material bed advancing conveyor run above said bottom coating material bed support and configured to convey said bottom coating material bed over said bottom coating material bed support.

Preferably the machine is embodied to transfer recovered excess coating material remaining in said excess coating material bed downstream of said elevator device fill assembly to the bottom coating material bed advancing conveyor run. In the latter, preferred, embodiment, enhanced control of the particle size distribution of the excess coating material passing onwards from the elevator wheel fill assembly to be re-used for the bottom coating bed is achieved by the provision of the inventive elevator device fill assembly.

In an embodiment hereof, the machine comprises a second or a downstream particles segregation enhancing assembly that is adapted to subject the recovered excess coating material bed passing over the recovered excess coating material bed support, downstream of the elevator device fill assembly, to a segregation enhancing action in order to cause the bed that passes to the bottom coating device to be composed of an upper layer of relative coarse fraction of the particulate coating material and a lower layer of a relative fine fraction of the particulate coating material.

In an embodiment the recovery run and the bottom coating material advancing bed conveyor run form part of one and the same conveyor belt, e.g. wire mesh conveyor belt, with the belt passing about a front roller and wherein the belt is partly surrounded by a curved deflector that forms an extension of bed so that excess coating material is moved around the front roller onto an inclined ascending portion of the bed support that adjoins a substantially horizontal portion of the bottom coating material bed support. With enhanced segregation by the second or downstream particles segregation enhancing assembly the coarse layer will follow a curved path close to the front roller and the finer layer will follow a curved path close to the curved deflector, so that the coarse layer will end up underneath the finer layer, at least in a first zone of the bottom coating material bed. In practice, possibly enhanced by yet a third or further particles segregation enhancing assembly associated with the bottom coating device, segregation will cause the coarser particles to rise through the finer layer and start to appear in the top surface of the bottom coating material bed further downstream from said first zone. Thereby the bottom coating bed will have a first section wherein the top surface is substantially composed of the finer layer, and a second zone downstream thereof wherein coarse particles are present in the top surface, possibly with an increasing presence of coarse particles as the bed moves further downstream due to continuing segregation.

In an operational method one can make use of the above described segregation effect in the bottom coating material bed, by selecting the drop point or contact point of products to be coated relative to the composition of the top surface of the bottom coating material bed. For example if it is desired to create a direct adhesion of coarse particles to the underside of the food products one can select a drop or contact point in the mentioned second zone. If mainly an initial coating of the underside with fines is desired one can select the drop or contact point in the first zone, where no or relatively few coarse particles are present in the top surface of the bottom coating bed.

In embodiments the coating machine is provided in at least one of a, optional, bottom coating material bed support and the recovered excess coating material bed support with a controllable coating material removal opening that is in communication with a coating material removal system adapted to permanently remove coating material, e.g. ultra-fine particles, e.g. dust, from the respective coating material bed. For example removed coating material is collected in a bin or other container, e.g. using a vacuum device.

In embodiments the in-line coating machine is further provided with an adjustable bypass opening device adapted to control one or more bypass openings in a bottom coating material bed support allowing to discharge an adjustable portion of the bottom coating material bed passing over said one or more bypass openings onto the recovered excess coating material bed, downstream of the elevator device fill assembly so as to bypass said elevator device fill assembly and be transferred to the bottom coating material bed advancing conveyor run. It will be appreciated that this arrangement provides further control over the process, as now at least some of the excess material may bypass the elevator device fill assembly. One could even envisage that this stream is subjected to some segregation and/or sieving process before reaching the excess coating material bed, so as to create separated streams of coarse and fine fraction materials, e.g. with one of said streams being passed to a position downstream of the elevator device fill assembly and one stream being passed to a position upstream of the elevator device fill assembly.

Whilst above particular focus has been on the control of filling of the elevator device, e.g. the elevator wheel, a further enhancement is achieved by providing an inventive top coating device adapted to be supplied with particulate coating material by the elevator device and to discharge said particulate coating material from above onto the food products conveyed by the food products conveyor in a direction of conveyance. Herein the top coating device comprises a hopper having a front wall facing counter to said direction of conveyance of food products, a sloping bottom wall adjoining the front wall at a lower corner portion of the hopper and sloping upwards from said lower corner portion in direction of conveyance of food products, as well as lateral hopper walls that delimit with said front wall and sloping bottom wall the hopper, wherein the hopper is open at a top thereof so as to receive therein particulate coating material gravity fed from the excess coating material elevator device. This arrangement has the advantage of allowing for a more optimal location of the elevator device, e.g. of the elevator wheel. Also it allows for a relative large angle of the bottom wall of the hopper relative to vertical, so a limited slope and thus a create a significant volume that buffers recovered excess coating material.

The in-line coating machine of the invention is possibly preceded by a pre-dusting device, and/or a batter application device for applying batter.

The in-line coating machine may for example be succeeded by coated food products heating device, such as a cooking or frying device, e.g. an oven, a deep-fry device, and/or by chilling device such as a freezer.

The particulate coating material particulate e.g. comprises crumbs, e.g. a mixture of coarse and fine particles, e.g. adding flavour and/or texture, including crispiness, to the food product. In particular in relation to crumbs, coating is sometimes also referred to as breading.

Food products that can, in suitable embodiments, be coated with a coating machine according to the invention include food products such as vegetables and meat, e.g. cut meat or formed meat such as burgers, e.g. of poultry, red meat, fish, sea-food products, fruit, nuts, etc.

The food products to be coated can be raw, fully or partially cooked, frozen or refrigerated, etc.

In embodiments the revolving elevator wheel is preferably embodied similar to the one described in NL1020511. It comprises an annular body with a horizontal rotation axis, a peripheral wall and a central opening. The annular body comprising inwardly extending lifting paddles and radially inwardly extending annular flanges, each along an edge of the peripheral wall. A circumferential array of pockets is defined by the lifting paddles, the annular flanges and a bottom, preferably formed by the peripheral wall. The pockets are open towards the central opening of the elevator wheel. These pockets are adapted to receive the excess coating material from the filling assembly. The lifting paddles are able to lift this excess coating material as the elevator wheel revolves, and the excess coating material is allowed to drop down by gravity out of the pockets into the top coating unit. An elevator wheel drive, e.g. including an electric motor, is provided for revolving the elevator wheel.

The present invention also relates to a method for in-line coating of food products, wherein use is made of an in-line coating machine as discussed herein.

The present invention also relates to a method for coating of food products, wherein use is made of a coating machine according to the invention, and wherein a particulate coating material is used which comprises a relative fine fraction and a relative coarse fraction of particulate coating material, and wherein the excess coating material bed segregates into an upper layer composed of a relative coarse fraction of the particulate coating material and a lower layer of a relative fine fraction of the particulate coating material, wherein the elevator device fill assembly is operated to cause a desired rate of relative fine fraction excess coating material to be discharged from the lower layer by control of the one or more adjustable discharge opening devices and associated one or more discharge openings in the recovered excess coating material bed support and to be received in the elevator device, and wherein the elevator device fill assembly is operated to cause a desired rate of relative coarse fraction excess coating material in the upper layer to be diverted by the adjustable upper layer diverter device engaging said upper layer into the elevator device.

In an embodiment use is made of a coating machine having a particles segregation enhancing assembly and subjecting the recovered excess coating material bed passing over the recovered excess coating material bed support, upstream of the elevator device fill assembly, to a segregation enhancing action in order to cause the upper layer engaged by the upper layer diverter device to be composed of a relative coarse fraction of the particulate coating material and to cause the lower layer of the excess coating material bed to be composed of a relative fine fraction of the particulate coating material.

In an embodiment use is made of an coating machine having an adjustable bypass opening device and controlled to discharge a portion of the bottom coating material bed passing over said one or more bypass openings onto the recovered excess coating material bed, downstream of the elevator device fill assembly so as to bypass said elevator device fill assembly and be transferred to the bottom coating material bed advancing conveyor run.

A second aspect of the invention relates to a coating machine adapted to coat food products with a particulate coating material, the machine comprising:
- a food products conveyor assembly adapted to receive food products to be coated at an inlet of the machine and to discharge coated food products at an outlet of the machine,
- a coating device arranged between the inlet and the outlet of the machine and adapted to be supplied with particulate coating material and to subject the food products to a coating treatment wherein some of the particulate coating material adheres to the food products, an excess coating material separation station configured to cause excess coating material to be separated from said coated food products in order to recover said excess coating material for re-use, an excess coating material recovery conveyor comprising:

a recovered excess coating material bed support adapted to receive thereon at a reception location said recovered excess coating material from said separation station to form a recovered excess coating material bed of said separated excess coating material on said recovered excess coating material bed support, a recovery conveyor run above said recovered excess coating material bed support and movable relative to said bed support and configured to convey said excess coating material bed over said recovered excess coating material bed support, a particulate coating material elevator device adapted to receive a portion of said excess coating material from said recovery conveyor and to supply said excess coating material to the coating device for re-use, an elevator device fill assembly configured to fill the elevator device with recovered excess coating material, a particles segregation enhancing assembly adapted to subject the recovered excess coating material bed passing over the recovered excess coating material bed support, upstream of the elevator device fill assembly, to a segregation enhancing action in order to cause an upper layer to be composed of a relative coarse fraction of the particulate coating material and a lower layer to be composed of a relative fine fraction of the particulate coating material, wherein the elevator device fill assembly comprises:

one or more adjustable discharge opening devices adapted to control one or more discharge openings in the recovered excess coating material bed support allowing to discharge at an adjustable rate a portion of the recovered excess coating material bed passing over said one or more discharge openings into the particulate coating material elevator device, and/or an adjustable upper layer diverter device that is configured to engage an upper layer of the recovered excess coating material bed passing over the recovered excess coating material bed support, with a lower layer passing underneath the diverter device, and to divert at least a portion of said upper layer at an adjustable rate into the particulate coating material elevator device.

The machine according to the second aspect of the invention may also comprise, in embodiments, one or more of the features discussed herein with reference to the first aspect of the invention.

The second aspect of the invention also relates to a method for coating of food products, wherein use is made of an coating machine according to the second aspect of the invention.

A third aspect of the invention relates to a coating machine adapted to coat food products with a particulate coating material, the machine comprising:

a food products conveyor assembly adapted to receive food products to be coated at an inlet of the machine and to discharge coated food products at an outlet of the machine, a coating device arranged between the inlet and the outlet of the machine and adapted to be supplied with particulate coating material and to subject the food products to a coating treatment wherein some of the particulate coating material adheres to the food products, an excess coating material separation station configured to cause excess coating material to be separated from said coated food products in order to recover said excess coating material for re-use, an excess coating material recovery conveyor comprising:

a recovered excess coating material bed support adapted to receive thereon at a reception location said recovered excess coating material from said separation station to form a recovered excess coating material bed of said separated excess coating material on said recovered excess coating material bed support, a recovery conveyor run above said recovered excess coating material bed support and movable relative to said bed support and configured to convey said excess coating material bed over said recovered excess coating material bed support, a particulate coating material elevator device adapted to receive a portion of said excess coating material from said recovery conveyor and to supply said excess coating material to the coating device for re-use, an elevator device fill assembly configured to fill the elevator device with recovered excess coating material, a particles segregation enhancing assembly adapted to subject the recovered excess coating material bed, e.g. whilst passing over the recovered excess coating material bed support, upstream and/or downstream of the elevator device fill assembly, to a segregation enhancing action in order to cause an upper layer to be composed of a relative coarse fraction of the particulate coating material and a lower layer to be composed of a relative fine fraction of the particulate coating material.

The machine according to the third aspect of the invention may also comprise, in embodiments, one or more of the features discussed herein with reference to the first aspect of the invention.

The third aspect of the invention also relates to a method for in-line coating of food products, wherein use is made of an in-line coating machine according to the third aspect of the invention.

The invention will now be explained with reference to the drawings. In the drawings:

FIG. 1 shows schematically in side view and cross section an example of an in-line coating machine according to the invention, FIG. 2 shows on a larger scale a part of the machine of FIG. 1, FIG. 3 shows a perspective view onto the elevator device fill assembly and segregation enhancing assembly of the machine of FIG. 1, FIG. 4 shows a perspective view onto the top coating device of the machine of FIG. 1, FIG. 5 shows an alternative embodiment of the machine of FIG. 1, having segregation enhancing assembly acting on the excess coating bed support, FIG. 6 shows an alternative embodiment of the machine of FIG. 1, having an adjustable bypass opening device.

DETAILED DESCRIPTION OF VARIOUS EMBODIMENTS

Figure 1:
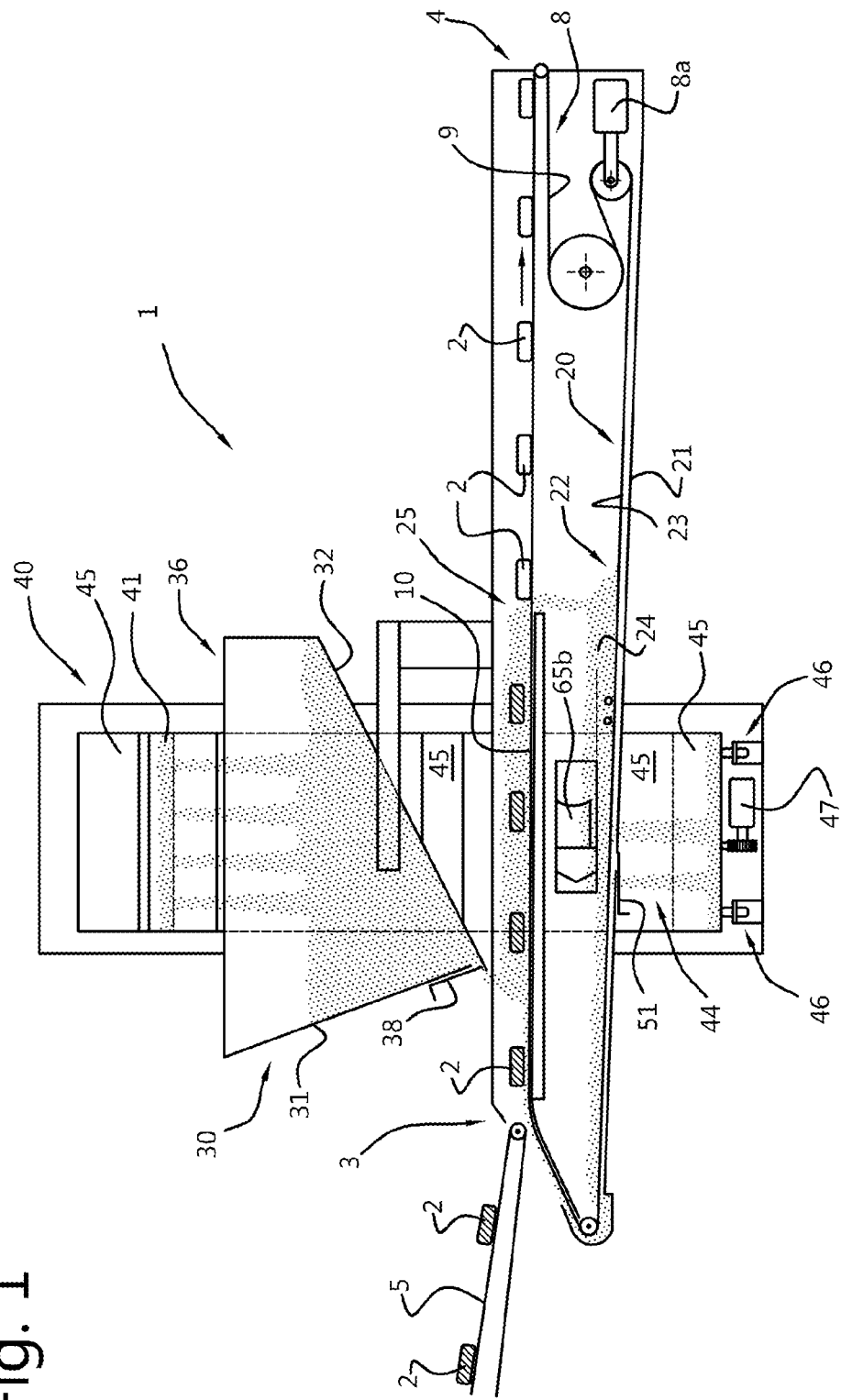
With reference to FIGS. 1-4 an exemplary embodiment of an in-line coating machine according to the invention will be discussed. The machine 1 is adapted to coat food products 2 with a particulate coating material, such as breading crumb material.
Figure 2:
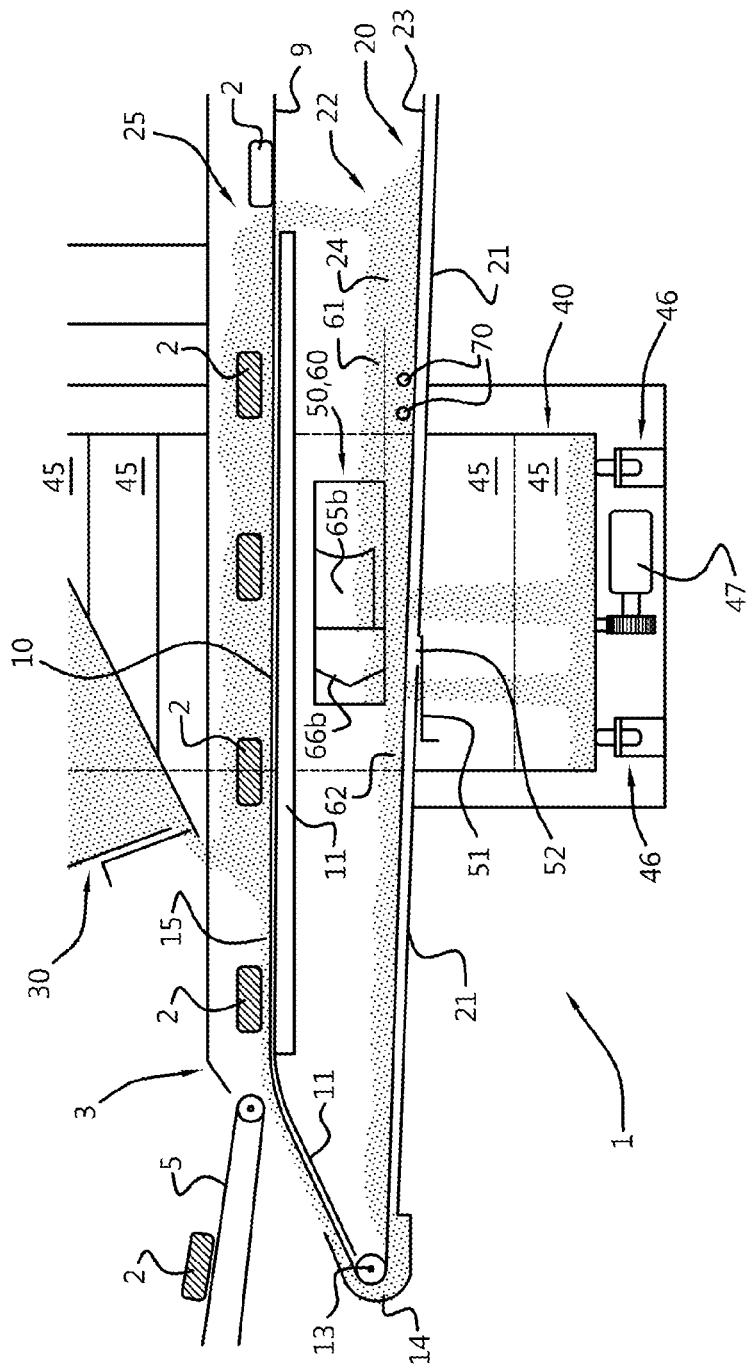

The coating machine 1 generally has a food products conveyor assembly that is adapted to receive the food products 2 to be coated at an inlet 3 of the machine and to discharge coated food products at an outlet 4 of the machine. For example the food products have already passed a batter machine and/or a pre-dusting machine. Here the products 2 are fed to the inlet 3 by a conveyor 5, e.g. of such other machine.

In the depicted embodiment the machine has a single or main belt conveyor 8 with a single endless belt 9, preferably with a mesh belt, e.g. a (stainless steel) wire mesh belt as is rather common in the art. A motor drive 8a, e.g. of variable speed, is provided to move the belt 9.

An upper run of the belt 9 here forms the food products conveyor assembly of the machine 1 and also forms a bottom coating material bed advancing conveyor run 10 of the machine. Underneath, a portion of, the length conveyor run 10 the machine has an associated bottom coating material bed support 11.

In operation of the machine the bottom coating material bed support 11 supports thereon a bottom coating material bed 15.

The advancing conveyor run 10 conveys this bottom coating material bed 15 over the bottom coating material bed support 11. As shown here, the bottom coating material bed 15 receives food products to be coated in proximity of the inlet 3 of the machine 1.

The machine also has a top coating device 30 that is supplied with particulate coating material and discharges particulate coating material from above onto the food products 2 received by the bottom coating material bed 15 and conveyed by the bottom coating material bed advancing conveyor run 10.

Figure 4:
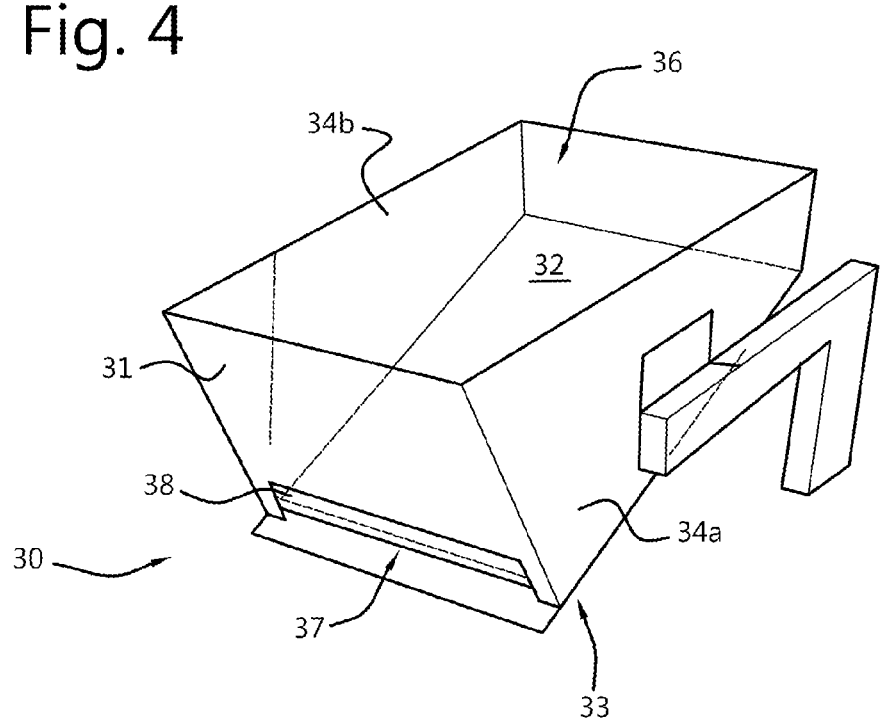

As shown in FIG. 4, the top coating device may comprises a hopper 30 having a front wall 31 facing counter to the direction of conveyance of food products, a sloping bottom wall 32 adjoining the front wall at a lower corner portion 33 of the hopper and sloping upwards from said lower corner portion in direction of conveyance of food products, as well as lateral hopper walls 34a, b that delimit with said front wall and sloping bottom wall the hopper. The hopper is open at a top 36 thereof so as to receive therein particulate coating material gravity fed from the excess coating material elevator device 40, here dropped directly from the device 40 into the hopper.

The hopper 30 has an outlet opening 37 in the lower corner region 33 from which the coating material is discharged, here an outlet opening 37 controlled by an outlet gate 38.

As is common in the field, operation of the in-line coating machine 1 causes some of the particulate coating material to adhere to the food products 2.

Downstream of the one or more coating devices, here downstream of the bed support 11 an excess coating material separation station 25 is provided which is configured to cause excess coating material to be separated from the coated food products in order to recover the excess coating material for re-use. In the very simple and practical embodiment depicted, the station 25 is no more than the trailing end of the support bed 11 which causes excess material to drop through the mesh belt 9 whilst the coated products 2 remain on the belt. In another embodiment, e.g. in addition to the trailing end of the bed 11, one or more blowers, air-knives, etc. may be provided to cause or enhance removal of excess coating particles, e.g. blowing said excess down through the mesh belt 9. In embodiments separation of excess material is enhanced by having a belt agitator device at station 25, so that excess material is dislodged from the belt and/or the food products.

As depicted here the belt 9 also forms an excess coating material recovery conveyor 20 of the machine.

Here conveyor 20 comprises a recovered excess coating material bed support 21 adapted to receive thereon at a reception location 22, here vertically below the station 25, recovered excess coating material from the separation station 25 and forming a recovered excess coating material bed 24 of separated excess coating material on said recovered excess coating material bed support 21. A recovery conveyor run 23 of the belt 9, effectively the lower run of the belt 9, extends and moves above the recovered excess coating material bed support 21 and relative to the bed support 21. In operation this run 23 conveys the excess coating material bed over the recovered excess coating material bed support 21.

As preferred the belt 9 extends just above the beds 11, 21, or, as preferred, the belt 9 rests on each of said beds and slides over said beds. This achieves a good transport of the coating material bed.

As depicted the machine 1 comprises a particulate coating material elevator wheel 40 that is adapted to supply a portion of the excess coating material to the top coating device 30 for re-use.

The machine further comprises an elevator wheel fill assembly 50 arranged along the lower recovery conveyor run 23 downstream of the reception location 22 and configured to fill pockets of the revolving particulate coating material elevator wheel with recovered excess coating material.

As can be seen the exemplary machine 1 is embodied to transfer recovered excess coating material remaining in the excess coating material bed 15 downstream of the elevator wheel fill assembly to the bottom coating material bed advancing conveyor run 11. In this embodiment a front roller 13 guiding the belt 9 is partly surrounded by a curved deflector 14 that forms an extension of bed 21 so that excess coating material is moved around the roller 13 onto an inclined ascending portion of the bed support 11 that adjoins a substantially horizontal portion of the bed support 11.

The elevator wheel 40 comprises:
  an annular wheel body 41 adapted to revolve about an axis of rotation and having a central opening;
  a circumferential array of pockets 45 in said annular wheel body, the pockets being open towards the central opening of the elevator wheel.

The wheel 40 is rotatably supported in a frame of the machine 1, here on rollers 46, to revolve about a substantially horizontal axis of revolution. A motor drive 47, e.g. of variable speed, is provided to drive the wheel 40, in this example a wheel having a circular toothed rack and the drive 47 having a mating pinion.

As depicted the bottom coating material bed advancing conveyor run 10 and the lower recovery conveyor run 23 each extend through the central opening of the annular wheel body, the lower recovery conveyor run 23 below the bottom coating material bed advancing conveyor run 10.

Also depicted is that the elevator wheel 40 passes over the top coating device 30 such that particulate coating material is gravity fed from pockets 45 into the top coating device 30.

The elevator wheel fill assembly 50 comprises:
  one or more adjustable discharge opening devices 51 adapted to control one or more discharge openings 52, here a single elongated slot across the bed support 21, here perpendicular to the direction of conveyance, in the recovered excess coating material bed support allowing to discharge at an adjustable rate a portion of the recovered excess coating material bed passing over the one or more discharge openings into pockets 45 of the particulate coating material elevator wheel 40.

In an alternative embodiment, not shown, the discharge openings 52 comprise one or more elongated slots across the bed support 21, advantageously parallel elongated slots, possibly of different length. Possibly, not shown, a discharge opening 52 is formed by an elongated slot, e.g. a rectilinear slot, extending at a non-perpendicular angle, e.g. 45°, to the direction of conveyance, and to the direction of movement of the elevator wheel 40.

Here the gap or effective passage for coating material through the slot 52 is controlled by a slidable gate 51 positioned along the underside of the bed support 21. A manual or power operate controller can be present to move the gate 51 into a desired position. Instead of such a simple embodiment more elaborate designs are also envisaged, e.g. including a drop-through rotary metering valve, etc.

The elevator wheel fill assembly further comprises:
an adjustable upper layer diverter device 60 that is configured to engage an upper layer 61 of the recovered excess coating material bed passing over the recovered excess coating material bed support 21, with a lower layer 62 passing underneath the diverter device 60, and to divert at least a portion of said upper layer at an adjustable rate into pockets 45 of the particulate coating material elevator wheel 40.

The machine is further provided with a particles segregation enhancing assembly 70 adapted to subject the recovered excess coating material bed passing over the recovered excess coating material bed support 21, upstream of the elevator device fill assembly 50, to a segregation enhancing action in order to cause the upper layer 61 engaged by the upper layer diverter device 60 to be composed of a relative coarse fraction of the particulate coating material and to cause a lower layer 62 of the excess coating material bed to be composed of a relative fine fraction of the particulate coating material.

In the depicted embodiment of FIGS. 1-4, the assembly 70 comprises one or more passive members, here rods, that extend above the recovery conveyor run 23. As shown here, the one or more rods 70 may extend across, at least a part of, the width of the excess material bed, so that said excess material is agitated by the passive members enhancing segregation. It is shown here that one or more rods, possibly rectilinear rods, extends horizontally parallel to the conveyor run across the width of the excess material coating bed.

Figure 3:
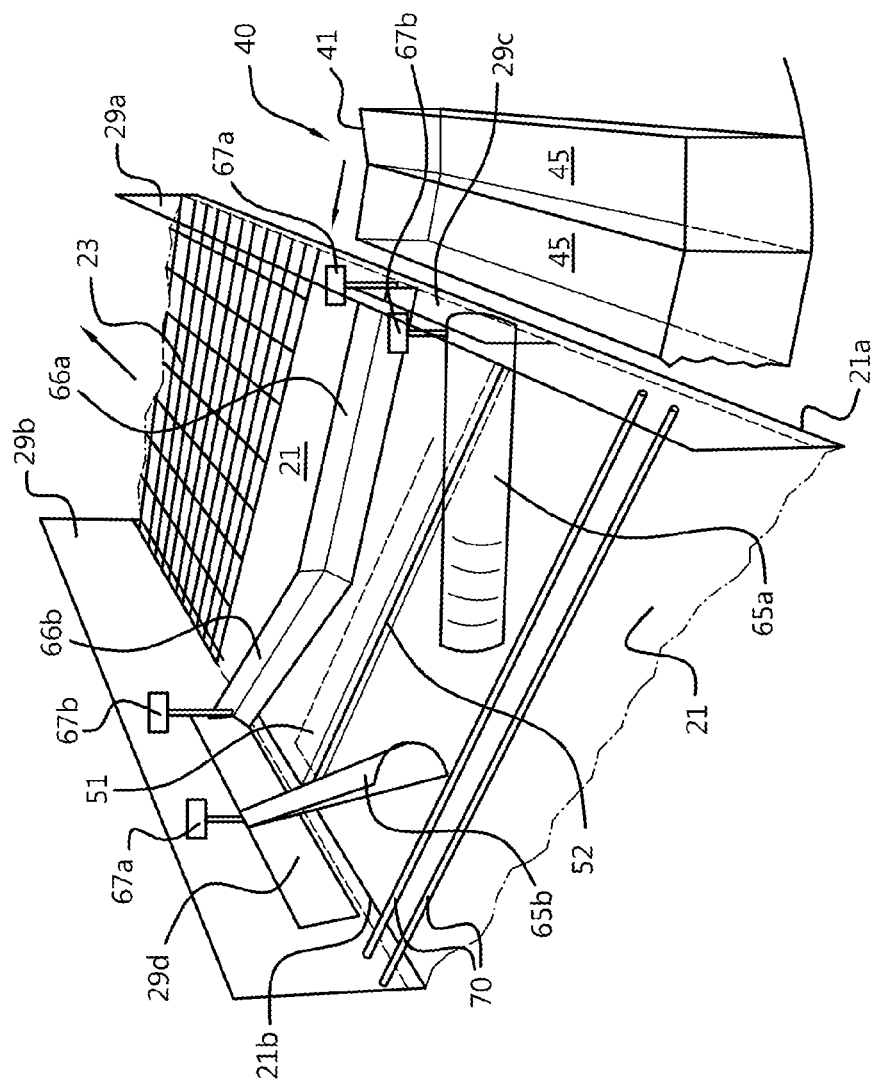

As can be seen in FIG. 3 the recovered excess coating material bed support 21 has opposed first and second lateral sides 21a, 21b. The upper layer diverter device 60 is adapted to divert a first stream of upper layer excess coating material over the first lateral side 21a and into the particulate coating material elevator device 40 and to divert a second stream of upper layer excess coating material over the second lateral side 21b and into the particulate coating material elevator device 40.

The upper layer diverter device 60 here comprises at least one diverter blade 65a, 65b engaging the upper layer and diverting at least a portion thereof over one of the lateral sides 21a, 21b and into the particulate coating material elevator device 40.

Here the two blades 65a, 65b are arranged in a V with point counter to the direction of conveyance of the recovered excess coating material bed when seen in top view. The blades 65a, 65b may meet at the point or may have, as shown here, spaced apart ends to leave a gap between the ends. For example each of the blades is attached, e.g. movable in height and/or in angular orientation, to a raised lateral housing wall 29a, 29b at each side of the bed 21.

In the depicted embodiment the upper layer diverter device 60 has a first set of one or more diverter blades 65a, b at a first location along the path of the lower recovery run 23 and a second set of one or more diverter blades 66a, b at a second location, downstream of the first location. Here the first set comprises two blades 65a, b arranged in a V with a point counter to the direction of conveyance of the recovered excess coating material bed when seen in top view, and with spaced apart ends to leave a gap in between said ends, and a second set of two blades 66a, b arranged in a V with a point counter to the direction of conveyance of the recovered excess coating material bed when seen in top view, and with ends joined at said point.

In embodiments, in view of adjusting the action and thus the rate and/or composition of the coating particles stream into the elevator device, here into the pockets of the elevator wheel, the upper layer diverter device is adjustable in at least one of:
height relative to the recovered excess coating material bed support allowing to control the thickness of the upper layer engaged by the upper layer diverter device;
width relative to the recovered excess coating material bed support allowing to control the width of the portion of the upper layer engaged by the upper layer diverter device,
angular orientation of the upper layer diverter device relative to a direction of conveyance of the recovered excess coating material bed when seen in top view.

It is depicted here that the machine comprises one or more height adjustment mechanisms 67a, b adapted to adjust the distance between the upper layer diverter device, here the blades 65a,b and 66a, b and the lower recovery run 23. For example the closer the upper layer diverter device is to the recovery run 23 and/or support bed 21, the more fine particles will be recovered.

It is depicted here that the machine further comprises an angle adjustment mechanisms, integrated with mechanism 67a, adapted to adjust the angular orientation of the upper layer diverter device 60, here blades 65a, b relative to the direction of conveyance of the recovered excess coating material bed when seen in top view. Here each diverter blade 65a, b is pivotable about a vertical rotation axis. For example the mechanism allows to set the angular orientation thereby covering an adjustable width of the lower recovery run by means of the upper layer diverter device or part thereof.

In embodiments, the adjustment mechanisms 67a, b are each individually operable. Possibly each adjustment mechanism is operable manually, but motor powered operation governed via a control system, e.g. a computerized control system, is also envisaged. It is also conceivable that in embodiments, the operation of the adjustment mechanisms 67a, b is coupled. E.g. physically, but the interaction can also be achieved via software.

As shown the machine has a housing with a pair of lateral housing walls 29a, b between which the lower recovery conveyor run 23 travels and raised to extend above said conveyor run 23 and the coating material bed 24.

One or both of these lateral housing walls 29a, b have an opening 29c, d therein through which diverted coating material is passed.

As shown here, preferably, these one or more lateral housing wall openings are located vertically above a lower section of the elevator device 40, e.g. a lower section of an elevator device that comprises a mobile array of pockets 45 adapted to receive therein particulate coating material. For example the elevator device has a revolving elevator wheel, arranged such that diverted coating material drops directly into pockets of the wheel.

Figure 5:
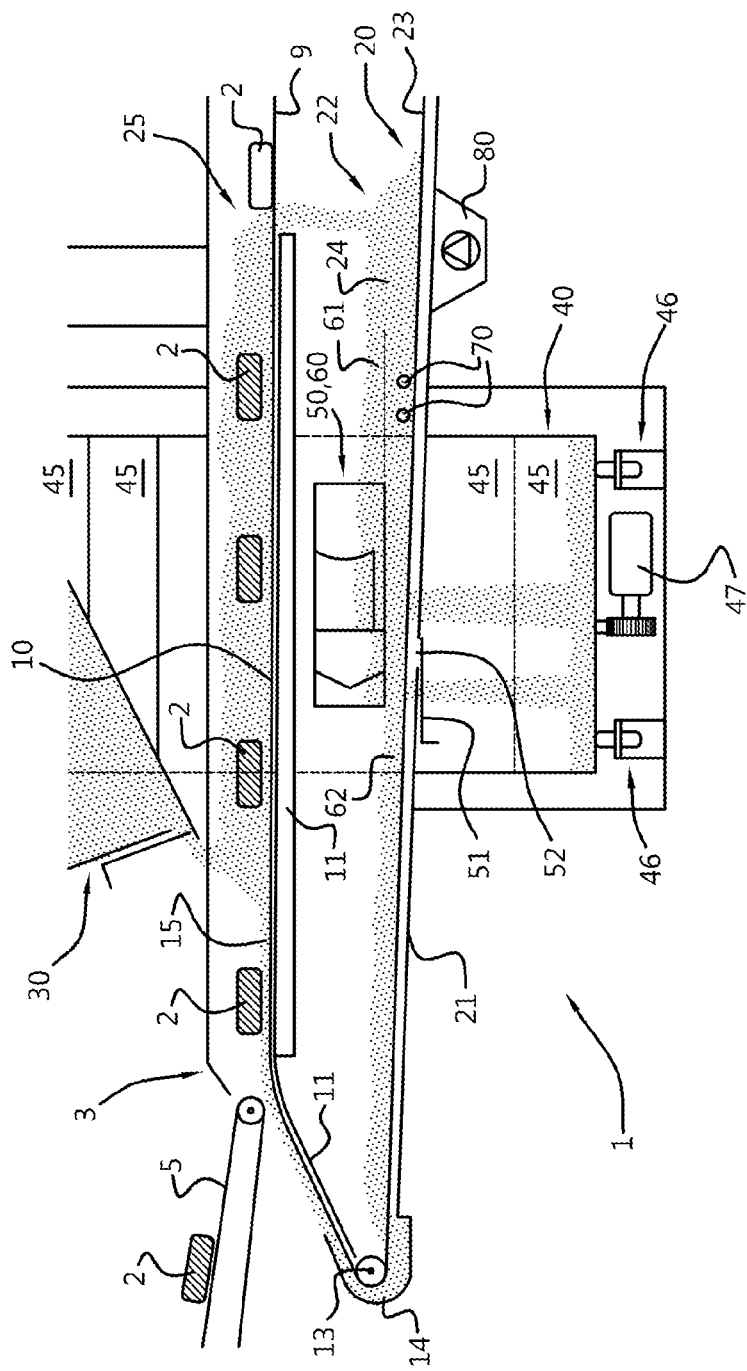

In FIG. 5, in order to enhance the segregation into layers of the excess material bed 24, the particles segregation enhancing assembly 70 comprises a vibratory device 80 acting on the recovered excess coating material bed support 21, e.g. on a portion thereof, thereby inducing or enhancing particle segregation ahead of the assembly 50. For example the device 80 is adjustable to achieve adjustable intensity of the vibration to which the bed is subjected, for example an excenter mass is rotatable at an adjustable speed to induce vibrations to a (part of) the bed 21.

FIG. 6 depicts an alternative embodiment of the machine of FIG. 1, having an adjustable bypass opening device 90 adapted to control one or more bypass openings 91 in the bottom coating material bed support 11. This allows to discharge an adjustable portion of the bottom coating material bed 15 passing over the one or more bypass openings 91 onto the recovered excess coating material bed 24, downstream of the elevator device fill assembly 50, so as to bypass said elevator device fill assembly 50 and be transferred to the bottom coating material bed advancing conveyor run 23. Provision of this arrangement further increases the control functionalities of the machine with respect to the composition of the coating that is passed to the one or more coating devices of the machine.

The invention claimed is:

1. A coating machine adapted to coat food products with a particulate coating material, the coating machine comprising:
- a food products conveyor moved by a drive and adapted to receive food products to be coated at an inlet of the coating machine and to discharge coated food products at an outlet of the coating machine;
- a coating device arranged between the inlet and the outlet of the coating machine and arranged to supply with particulate coating material and to subject the food products to a coating treatment wherein some of the particulate coating material adheres to the food products;
- a separation station for excess coating material and configured to separate excess coating material from said coated food products to recover the excess coating material for reuse;
- an excess coating material recovery conveyor including:
- a recovered excess coating material bed support adapted to receive thereon at a reception location the recovered excess coating material from said separation station to form a recovered excess coating material bed of separated excess coating material on the recovered excess coating material bed support;
- a recovery conveyor run above said recovered excess coating material bed support and movable relative to said excess coating material bed support and configured to convey said excess coating material bed over said recovered excess coating material bed support;
- a particulate coating material elevator device driven by a motor drive and adapted to receive a portion of the excess coating material from said recovery conveyor and to supply the excess coating material to the coating device for reuse;
- wherein the coating machine comprises an elevator device fill assembly arranged along the recovery conveyor downstream of the reception location and configured to fill the elevator device with recovered excess coating material;
- wherein said elevator device fill assembly includes:
- at least one adjustable discharge opening device adapted to control at least one discharge opening in the recovered excess coating material bed support arranged to discharge at a first adjustable-rate a portion of the recovered excess coating material bed passing over the at least one discharge opening into the particulate coating material elevator device;
- an upper layer diverter device configured to engage an upper layer of the recovered excess coating material bed passing over the recovered excess coating material bed support, with a lower layer passing underneath the upper layer diverter device, and to divert at least a portion of said upper layer at a second adjustable rate into the elevator device.

2. The coating machine according to claim 1, further comprising a particles segregation enhancing assembly adapted to subject the recovered excess coating material bed passing over the recovered excess coating material bed support, upstream of the elevator device fill assembly, to a segregation enhancing action to engage the upper layer by the upper layer diverter device to be composed of a coarse fraction of the particulate coating material and to compose a lower layer of the excess coating material bed of a fine fraction relative to the coarse fraction of the particulate coating material.

3. The coating machine according to claim 1, wherein the upper layer diverter device is arranged in proximity and upstream, seen in a direction of conveyance of the bed, of the at least one discharge opening in the recovered excess coating material bed support.

4. The coating machine according to claim 1, wherein the upper layer diverter device is adjustable in at least one of:
- height relative to the recovered excess coating material bed support arranged to control a thickness of the upper layer engaged by the upper layer diverter device;
- width relative to the recovered excess coating material bed support arranged to control a width of the portion of the upper layer engaged by the upper layer diverter device;
- angular orientation of the upper layer diverter device relative to a direction of conveyance of the recovered excess coating material bed when seen in top view.

5. The coating machine according to claim 1, wherein the recovered excess coating material bed support has opposed first and second lateral sides; and
- wherein the upper layer diverter device is adapted to divert a first stream of upper layer excess coating material over the first lateral side and into the particulate coating material elevator device and to divert a second stream of upper layer excess coating material over the second lateral side and into the particulate coating material elevator device.

6. The coating machine according to claim 1, wherein the recovered excess coating material bed support has opposed first and second lateral sides; and
- wherein the upper layer diverter device comprises first and second diverter blades engaging the upper layer and diverting at least a portion of the upper layer over one of said first and second lateral sides and into the particulate coating material elevator device, wherein the first and second diverter blades are each adapted to divert a respective stream of the upper layer excess coating material over a respective lateral side and into the particulate coating material elevator device.

7. The coating machine according to claim 1, wherein the coating device comprises a top coating device arranged to supply with particulate coating material by said particulate coating material elevator device and to discharge said particulate coating material from above onto the food products conveyed by the food products conveyor in a direction of conveyance.

8. The coating machine according to claim 1, wherein the particulate coating material elevator device comprises a movable array of pockets adapted to receive therein particulate coating material, said particulate coating material elevator device being arranged to move said movable array of pockets along an endless path that passes said elevator device fill assembly to fill excess particulate coating material into said movable array of pockets and that passes said coating device to discharge said particulate coating material from said movable array of pockets and supply said particulate coating material discharged to said coating device.

9. The coating machine according to claim 1, wherein the particulate coating material elevator device comprises an elevator wheel including:
  an annular wheel body adapted to revolve about an axis of rotation and having a central opening;
  a circumferential array of pockets in said annular wheel body, the circumferential array of pockets being open towards the central opening of the annular wheel body;
  wherein the food products conveyor and the recovery conveyor each extend through the central opening of the annular wheel body of the elevator wheel, the recovery conveyor run below the food products conveyor;
  wherein the elevator wheel passes below the elevator device fill assembly allowing excess material to be gravity fed into the pockets.

10. The coating machine according to claim 1, wherein the coating device is a top coating device arranged to be supplied with particulate coating material by said elevator device and to discharge said particulate coating material from above onto the food products conveyed by a food products conveyor in a direction of conveyance.

11. The coating machine according to claim 8, wherein the coating device is a top coating device arranged to be supplied with the particulate coating material by said elevator device and to discharge said particulate coating material from above onto the food products conveyed by the food products conveyor in a direction of conveyance; and
  wherein the pockets of the particulate coating material elevator device passes over the top coating device such that particulate coating material is gravity fed from a pocket into the top coating device.

12. The coating machine according to claim 1, wherein the coating machine comprises a bottom coating device comprising:
  a bottom coating material bed support;
  wherein the bottom coating material bed support is adapted to support thereon a bottom coating material bed of particulate coating material;
  wherein the coating machine is configured so that the food products to be coated are received on said bottom coating material bed;
  a bottom coating material bed advancing conveyor run above said bottom coating material bed support and configured to convey said bottom coating material bed over said bottom coating material bed support;
  wherein the coating machine is embodied to transfer recovered excess coating material remaining in said excess coating material bed downstream of said elevator device fill assembly to the bottom coating material bed advancing conveyor run.

13. The coating machine according to claim 12, further comprising an adjustable bypass opening device arranged to control at least one bypass opening in the bottom coating material bed support allowing to discharge an adjustable portion of the bottom coating material bed passing over said at least one bypass opening onto the recovered excess coating material bed, downstream of the elevator device fill assembly, to bypass said elevator device fill assembly and be transferred to the bottom coating material bed advancing conveyor run.

14. The coating machine according to claim 13, wherein the recovery conveyor run is a mesh belt conveyor; and
  wherein the bottom coating material bed advancing conveyor run is a mesh belt conveyor, wherein the recovery conveyor run and the bottom coating material bed advancing conveyor run are formed by one and the same belt conveyor.

15. The coating machine according to claim 1, wherein the coating device is a top coating device arranged to supply with particulate coating material by said elevator device and to discharge said particulate coating material from above onto the food products conveyed by the food products conveyor in a direction of conveyance,
  wherein the top coating device comprises a hopper having a front wall facing counter to said direction of conveyance of food products, a sloping bottom wall adjoining the front wall at a lower corner portion of the hopper and sloping upwards from said lower corner portion in the direction of conveyance of food products, as well as lateral hopper walls that delimit with said front wall and sloping bottom wall the hopper;
  wherein the hopper is open at a top thereof to receive therein particulate coating material gravity fed from the excess coating material elevator device.

16. A method for coating of food products, comprising the steps of providing the coating machine according to claim 1, including:
  providing the food products conveyor with food products to be coasted at the inlet of the coating machine;
  supplying the coating device with particulate coating material;
  subjecting the food products to particulate coating material;
  recovering excess coating material by separating excess coating material from the coated food products by the separation station;
  transporting excess coating material along an excess coating material recovery conveyor;
  filling an elevator fill device assembly with recovered excess coating material from the excess coating material recovery conveyor.

17. The method according to claim 16, and wherein the particulate coating material is used which comprises a fine fraction and a coarse fraction relative to the fine fraction of particulate coating material; and
  wherein the excess coating material bed segregates into an upper layer composed of a relative coarse fraction of the particulate coating material and a lower layer of a relative fine fraction of the particulate coating material;

wherein the elevator device fill assembly is arranged to discharge a desired rate of the fine fraction excess coating material from the lower layer by control of the at least one adjustable discharge opening device and associated at least one discharge opening in the recovered excess coating material bed support and to be received in the elevator device; and wherein the elevator device fill assembly is arranged to divert a desired rate of the coarse fraction excess coating material in the upper layer by the adjustable upper layer diverter device engaging said upper layer the elevator device.

18. The method according to claim 17, wherein use is made of an in-line coating machine having a particles segregation enhancing assembly subjecting the recovered excess coating material bed passing over the recovered excess coating material bed support, upstream of the elevator device fill assembly, to a segregation enhancing action to compose the upper layer engaged by the upper layer diverter device of a relative coarse fraction of the particulate coating material and to compose the lower layer of the excess coating material bed of a relative fine fraction of the particulate coating material.

19. The method according to claim 16, wherein an adjustable bypass opening device controls at least one bypass opening in a bottom coating material bed support allowing to discharge an adjustable portion of the bottom coating material bed passing over said at least one bypass opening onto the recovered excess coating material bed, downstream of the elevator device fill assembly, to bypass said elevator device fill assembly and be transferred to a bottom coating material bed advancing conveyor run.

* * * * *